(12) United States Patent
Carmen

(10) Patent No.: US 7,249,064 B1
(45) Date of Patent: Jul. 24, 2007

(54) METHOD FOR CONSUMER REFERRAL OF PRODUCTS TO RETAILERS

(76) Inventor: Billy W. Carmen, 2051 W. Mountain St., Glendale, CA (US) 91201

( * ) Notice: Subject to any disclaimer, the term of this patent is extended or adjusted under 35 U.S.C. 154(b) by 561 days.

(21) Appl. No.: 10/758,885

(22) Filed: Jan. 16, 2004

(51) Int. Cl.
 *G06Q 30/00* (2006.01)
(52) U.S. Cl. ...................................... 705/26
(58) Field of Classification Search ................ 705/26, 705/27
 See application file for complete search history.

(56) References Cited

U.S. PATENT DOCUMENTS

| | | | | |
|---|---|---|---|---|
| 6,029,141 A | * | 2/2000 | Bezos et al. ............... | 705/27 |
| 2004/0215542 A1 | * | 10/2004 | Rossides .................... | 705/35 |
| 2004/0230503 A1 | * | 11/2004 | Lucas ........................ | 705/28 |
| 2004/0243478 A1 | * | 12/2004 | Walker et al. .............. | 705/26 |

FOREIGN PATENT DOCUMENTS

JP            2004-178317        * 6/2004

OTHER PUBLICATIONS

No Author, "Amazon.com introduces Amazon.com Associates—A new model for Internet-based commerce.", Business Wire, Jul. 18, 1996. Retrieved from Dialog File: 16, Acc#: 04463978.*

* cited by examiner

*Primary Examiner*—Naeem Haq
(74) *Attorney, Agent, or Firm*—Lee W. Tower

(57) ABSTRACT

A method is provided for consumer referral of products to retailers. A manufacturer database is maintained having manufacturer entries including the manufacturer's identification, retailers stocking any of the manufacturer's products, and the manufacturer's products stocked by the retailer. A consumer database with consumer entries is maintained for registered consumers. Products in the manufacturer database are displayed on the public network. A consumer viewing the displayed products on the public network can select a product to refer to a retailer. If the retailer does not stock the referred product or a set number of consumers in the consumer database other than the referring consumer have not already referred the referred product to the referred retailer, then the referred product and the referred retailer are entered into the consumer entry in the consumer database. If the consumer referral results in a sale to the retailer, then the manufacturer rewards the consumer.

11 Claims, 28 Drawing Sheets

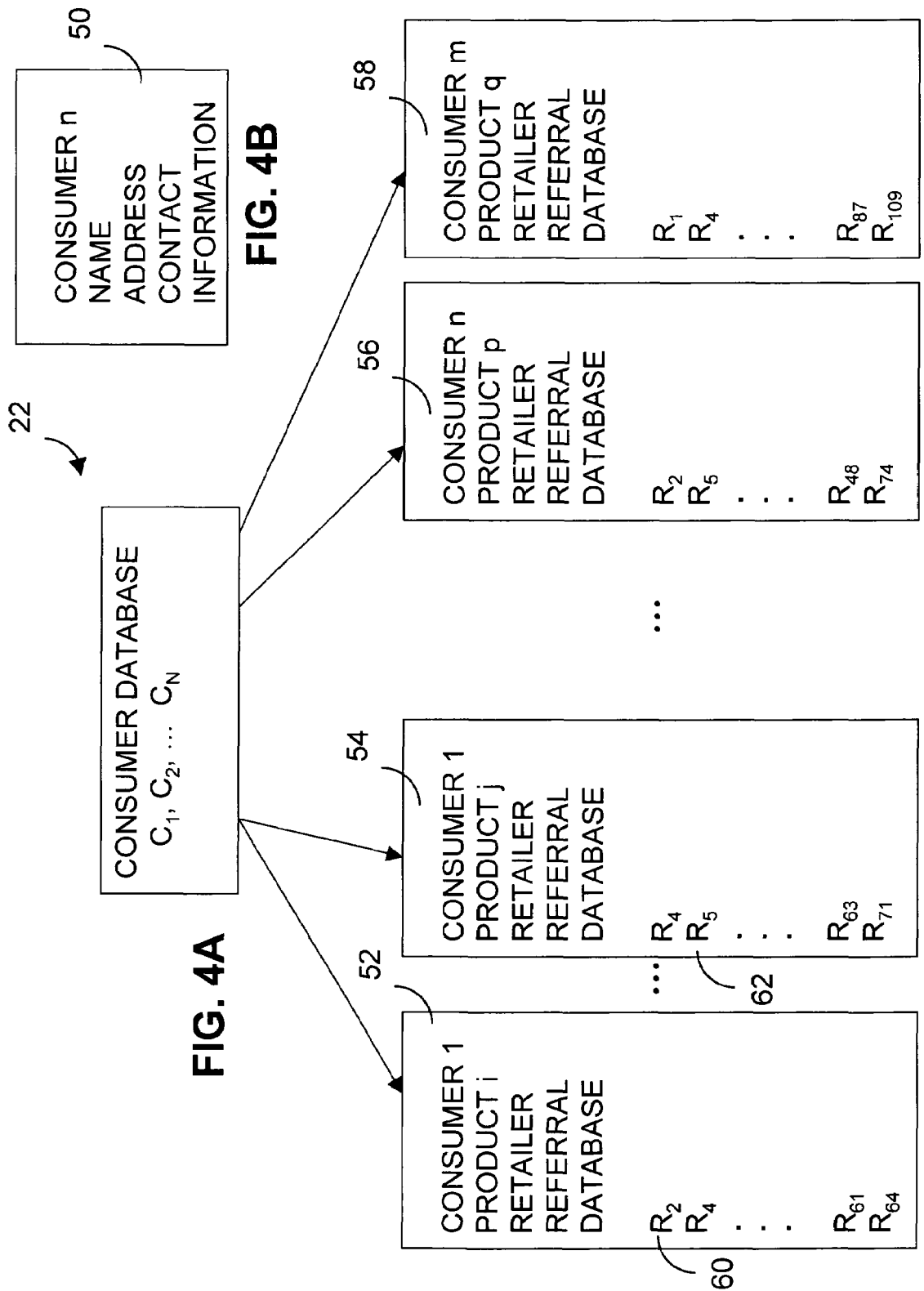

RETAILER DATABASE

RETAILER NAME    A
    ADDRESS
    PHONE
    EMAIL
    WEB ADDRESS
    CONTACT NAME
    PRODUCTS STOCKED
    PRODUCTS REFERRED

RETAILER NAME    B
    ADDRESS
    PHONE
    EMAIL
    WEB ADDRESS
    CONTACT NAME
    PRODUCTS STOCKED
    PRODUCTS REFERRED

⋮

RETAILER NAME    N
    ADDRESS
    PHONE
    EMAIL
    WEB ADDRESS
    CONTACT NAME
    PRODUCTS STOCKED
    PRODUCTS REFERRED

FIG. 5B

100 — CONSUMER - BUSINESS SERVICE PROVIDER MAINTAINS A MANUFACTURER DATABASE INCLUDING A PLURALITY OF RECORDS, EACH RECORD FOR A MANUFACTURER CONTAINING DATA INCLUDING THE MANUFACTURER'S NAME, ADDRESS, CONTACT INFORMATION, AND FOR EACH RETAILER STOCKING ANY OF THE MANUFACTURER'S PRODUCTS, THE RETAILER'S NAME, ADDRESS, AND CONTACT INFORMATION, AND THE PRODUCTS OF THE MANUFACTURER STOCKED BY THE RETAILER.

102 — CONSUMER - BUSINESS SERVICE PROVIDER MAINTAINS FOR EACH MANUFACTURER RECORD PRODUCT INFORMATION FOR EACH OF MANUFACTURER'S PRODUCTS, THE PRODUCT INFORMATION INCLUDING THE PRODUCT NAME, SKU NUMBER, DESCRIPTION, PHOTOS, MSRP, WHOLESALE PRICE, TAX INFORMATION, SHIPPING INFORMATION, OPTIONS INFORMATION, WARRANTY INFORMATION, PRODUCT RETURN POLICY, AND REFERRAL POLICY

104 — CONSUMER - BUSINESS SERVICE PROVIDER MAINTAINS A CONSUMER DATABASE INCLUDING A PLURALITY OF RECORDS, EACH RECORD FOR A CONSUMER CONTAINING DATA INCLUDING THE CONSUMER NAME, ADDRESS, CONTACT INFORMATION, AND FOR EACH PRODUCT REFERRED BY THE CONSUMER, THE RETAILERS TO WHICH THE PRODUCT WAS REFERRED BY THE CONSUMER.

106 — CONSUMER - BUSINESS SERVICE PROVIDER MAINTAINS A RETAILER DATABASE INCLUDING A PLURALITY OF RECORDS, EACH RECORD FOR A RETAILER CONTAINING DATA INCLUDING THE RETAILER NAME, ADDRESS, CONTACT INFORMATION, PRODUCTS STOCKED BY THE RETAILER, AND PRODUCTS REFERRED TO THE RETAILER.

FIG. 6

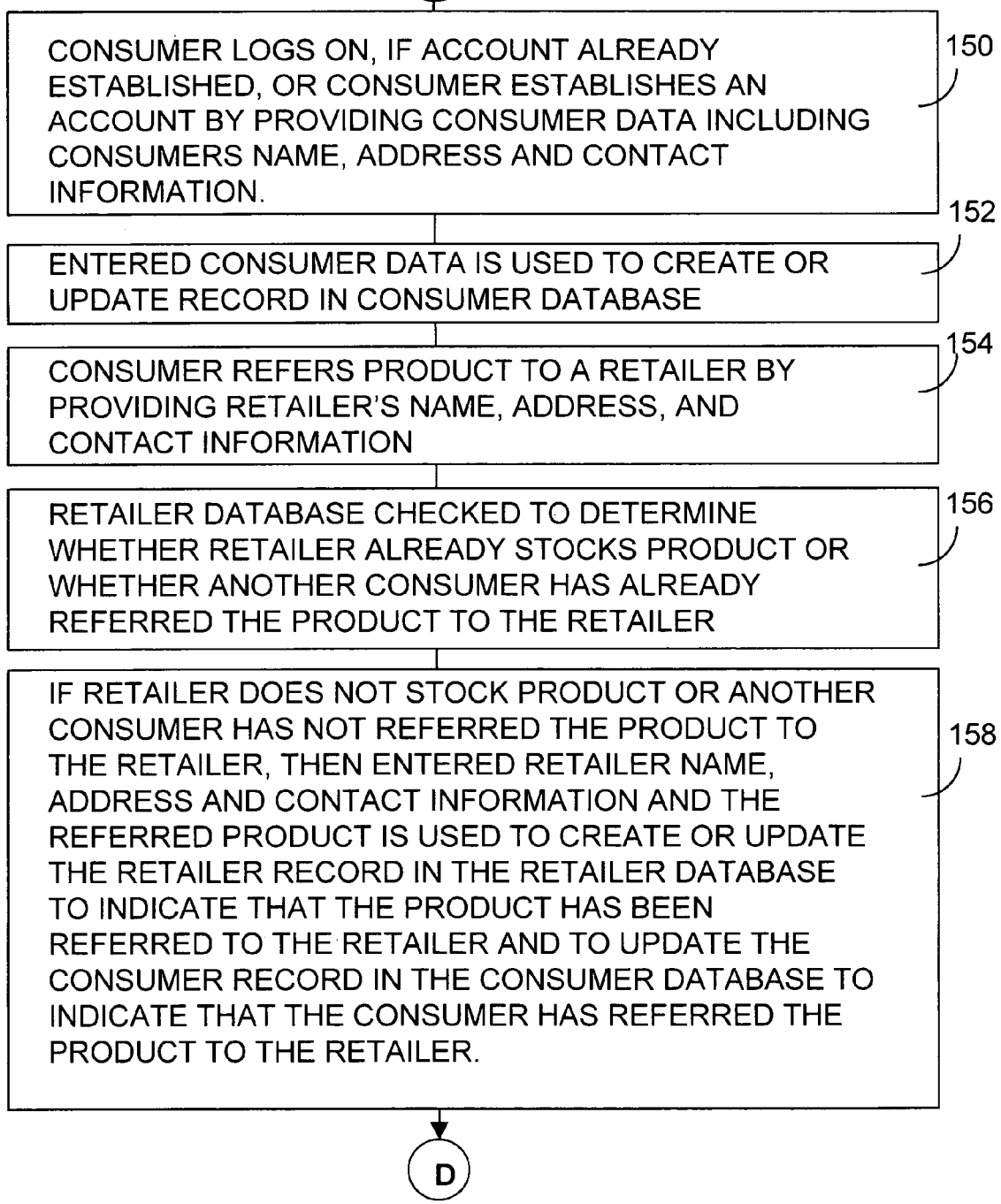

FIG. 9B

ALTERNATELY IF THE RETAILER DOES NOT STOCK THE PRODUCT AND IF THE MANUFACTURER REFERRAL POLICY PERMITS A REWARD TO THE FIRST SET NUMBER OF CONSUMERS THAT REFER A PRODUCT TO A RETAILER, THEN IF LESS THAN THE SET NUMBER OF CONSUMERS HAVE REFERRED THE PRODUCT TO THE RETAILER, THE ENTERED RETAILER NAME, ADDRESS AND CONTACT INFORMATION AND THE REFERRED PRODUCT IS USED TO CREATE OR UPDATE THE RETAILER RECORD IN THE RETAILER DATABASE TO INDICATE THAT THE PRODUCT HAS BEEN REFERRED TO THE RETAILER AND TO UPDATE THE CONSUMER RECORD IN THE CONSUMER DATABASE TO INDICATE THAT THE CONSUMER HAS REFERRED THE PRODUCT TO THE RETAILER.

170 — REFERRED RETAILER NAME, ADDRESS, AND CONTACT INFORMATION IS PROVIDED TO MANUFACTURER

172 — MANUFACTURER OR MANUFACTURER REPRESENTATIVE ATTEMPTS SALE OF REFERRED PRODUCT TO RETAILER

174 — IF SALE IS MADE TO THE RETAILER, THEN THE RETAILER RECORD IN THE RETAILER DATABASE IS UPDATED TO INDICATE THE RETAILER STOCKS THE PRODUCT, THE MANUFACTURER RECORD IN THE MANUFACTURER DATABASE IS UPDATED TO INDICATE THAT THE RETAILER STOCKS THE PRODUCT, AND THE CONSUMER RECORD IN THE CONSUMER DATABASE IS SEARCHED TO DETERMINE THE CONSUMER OR CONSUMERS THAT REFERRED THE PRODUCT TO THE RETAILER.

176 — IF THE POLICY OF THE MANUFACTURER IS TO REWARD THE FIRST CONSUMER THAT REFERRED THE PRODUCT, THEN THE REFERRING CONSUMER IS REWARDED BY THE MANUFACTURER, AND THE CONSUMER RECORD IN THE CONSUMER DATABASE IS UPDATED TO REMOVE THE REFERRAL OF THE PRODUCT.

178 — ALTERNATELY, IF THE POLICY OF THE MANUFACTURER IS TO REWARD A FIRST SET NUMBER OF CONSUMERS THAT REFERRED THE PRODUCT, THEN THE REFERRING CONSUMERS ARE REWARDED BY THE MANUFACTURER, AND THE CONSUMER RECORDS IN THE CONSUMER DATABASE ARE UPDATED TO REMOVE THE REFERRALS OF THE PRODUCT.

CONSUMER LOGIN
PLEASE ENTER YOUR LOGIN INFORMATION

USER NAME

PASSWORD

180

DON'T HAVE AN ACCOUNT

GET AN ACCOUNT NOW

CONSUMER REGISTRATION
FIRST NAME
LAST NAME
COMPANY

BILLING ADDRESS
  ADDRESS 1
  ADDRESS 2
  CITY
  STATE/PROVINCE
  ZIP
  COUNTRY
  PHONE
  EMAIL

IS THIS ALSO YOUR SHIPPING ADDRESS?

[YES]    [NO]

WOULD YOU LIKE TO SUBSCRIBE TO OUR MAILING LIST?

[YES]    [NO]

PRESS CONTINUE WHEN YOU ARE DONE:
  [CONTINUE]

ENTER THE USERNAME AND PASSWORD
YOU WISH TO USE

USER NAME

PASSWORD

REENTER PASSWORD

YOU ARE LOGGED IN AS    CONSUMER A

| BROWSE ONLINE PRODUCTS STORE |
| VIEW YOUR PURCHASE HISTORY |
| VIEW YOUR REFERRALS |
| EDIT YOUR USER PROFILE |
| CHANGE YOUR PASSWORD |
| CLICK TO LOGOUT |

FIG. 12

CONSUMER CONTACT INFORMATION
- NAME
- ADDRESS 1
- ADDRESS 2
- CITY
- STATE/PROVINCE
- ZIP
- COUNTRY
- PHONE
- FAX
- EMAIL

PLEASE SEND ME CATALOGS
[ YES ]    [ NUMBER ]

PRODUCT TO BE REFERRED TO RETAILER
[ ]    BIFOCAL SAFETY GLASSES

RETAILER REFERRAL INFORMATION
- RETAILER NAME
- ADDRESS 1
- ADDRESS 2
- CITY
- STATE/PROVINCE
- ZIP
- PHONE
- FAX
- WEB ADDRESS
- EMAIL

COMMENTS/SUGGESTIONS/MESSAGE TO RETAILER

MANUFACTURER REGISTRATION
FIRST NAME
LAST NAME
COMPANY

BILLING ADDRESS
  ADDRESS 1
  ADDRESS 2
  CITY
  STATE/PROVINCE
  ZIP
  COUNTRY
  PHONE
  EMAIL
  WEB ADDRESS

WOULD YOU LIKE TO SUBSCRIBE TO OUR MAILING LIST?

[ YES ]   [ NO ]

READ MANUFACTURER'S TERMS

I AM AUTHORIZED BY COMPANY AND AGREE WITH TERMS, CONTINUE

[ I AGREE ]

ENTER THE USERNAME AND PASSWORD
YOU WISH TO USE

USER NAME

PASSWORD

REENTER PASSWORD

YOU ARE LOGGED IN AS     MANUFACTURER A

| BROWSE ONLINE PRODUCTS STORE |
| EDIT YOUR PROFILE |
| ADD/EDIT PRODUCTS |
| CHANGE YOUR PASSWORD |
| CLICK TO LOGOUT |

PRODUCT NAME
MANUFACTURER

DESCRIPTION, OPTIONS, WARRANTY,
RETURN POLICY

REFERRAL/REWARD POLICY

PRODUCT PHOTOS

DISCOUNTED PRICE

MSRP RETAIL PRICE

WHOLESALE PRICE

WEIGHT/DIMENSIONS

PRODUCT # (SKU)

SHIPPING ADDED?   YES   NO

TAX ADDED?   YES   NO

MANUF. REPRESENTATIVES

FIG. 17

```
┌─────────────────────────────────────────────┐ ─270
│ FOR A MANUFACTURER RECORD IN THE            │
│ MANUFACTURER DATABASE COMPARE THE           │
│ PRODUCTS SOLD BY THE MANUFACTURER TO A      │
│ SELECTED RETAILER TO ALL THE PRODUCTS       │
│ STOCKED BY ANOTHER RETAILER IN THE RETAILER │
│ DATABASE                                    │
└─────────────────────────────────────────────┘
                      │
┌─────────────────────────────────────────────┐ ─272
│ COMPARE THE PRODUCTS SOLD BY THE            │
│ MANUFACTURER TO THE SELECTED RETAILER TO    │
│ THE PRODUCTS STOCKED THE OTHER RETAILER IN  │
│ THE RETAILER DATABASE BY COMPARING THE      │
│ DESCRIPTIONS OF THE PRODUCTS SOLD TO THE    │
│ SELECTED RETAILER TO THE DESCRIPTIONS OF ALL│
│ THE PRODUCTS STOCKED BY THE OTHER RETAILER  │
│ IN THE RETAILER DATABASE BY ACCESSING THE   │
│ PRODUCT DESCRIPTIONS IN THE MANUFACTURER    │
│ DATABASE                                    │
└─────────────────────────────────────────────┘
                      │
┌─────────────────────────────────────────────┐
│ IF THE COMPARISON BETWEEN THE DESCRIPTION   │
│ OF PRODUCTS SOLD BY THE MANUFACTURER TO     │ ─274
│ THE SELECTED RETAILER AND THE DESCRIPTION OF│
│ ALL THE PRODUCTS STOCKED BY THE OTHER       │
│ RETAILER PASSES A THRESHOLD VALUE, THEN     │
│ RECOMMENDING TO THE MANUFACTURER TO         │
│ ATTEMPT TO SELL THE PRODUCTS SOLD BY THE    │
│ MANUFACTURER TO THE SELECTED RETAILER TO    │
│ THE OTHER RETAILER                          │
└─────────────────────────────────────────────┘
                      │                        ─276
┌─────────────────────────────────────────────┐
│ REPEAT THESE STEPS FOR EACH RETAILER IN THE │
│ RETAILER DATABASE                           │
└─────────────────────────────────────────────┘
```

FIG. 20

METHOD FOR CONSUMER REFERRAL OF PRODUCTS TO RETAILERS

BACKGROUND OF THE INVENTION

1. Field of the Invention

This invention relates to a method for consumers to refer products to retailers benefiting the manufacturer, the retailer, and the consumer.

2. Description of the Related Art

A problem faced by many medium and small businesses is how to penetrate retail markets with their products. There are many barriers to placing a product onto a retailer's shelf. Retailers often have limited shelf space, and in warehouse type stores such as Costco and Walmart, there are stringent controls and procedures for the manufacturer to meet in order to place the product. This coupled with the standardization of products in the warehouse type stores such as Costco and Walmart, effectively keeps many interesting and deserving products off the market or relegated to niche markets and niche advertising.

Another obstacle for the medium and small businesses is the lack of resources for marketing their products. The internet has helped many to sell their products and provided a much needed outlet for manufacturer's products. When equal access to internet search engine results are provided then it is possible to find a manufacturer's product. However, with the advent of fairly universal search engines such as Google, search engine results or their display order can be sold to the highest bidder, effectively relegating the medium and small businesses to a lower rung on the retail ladder.

To market a product directly to retailers the obstacles are even higher. How to approach retailers and how to present a product to a retailer so that the retailer will carry the product requires that the manufacturer understand the retailers and meet with them to ever accomplish a sale. The manufacturer must comply with all the retailer's procedures, which for a large multi-state or international retailer may be a manual that is two inches thick. This is enough to discourage many entrepreneurs. Another obstacle is that often a manufacturer may have only one or two products to market to a retailer. This puts the small manufacturer at a disadvantage compared to manufacturers with a whole line of products to sell to the retailer. The reason for this is that the effort for both the retailer and the manufacturer is essentially the same whether the retailer is dealing with a small manufacturer with one or two products, or whether the retailer is dealing with a manufacturer with a line of products. When the retailer is dealing with the larger manufacturer, the retailer can audit the processes and quality of the manufacturer, effectively covering the whole product line. The retailer can also perform audits of a smaller manufacturer, but since fewer products are covered, then effective cost of the audit is higher.

It is possible for the manufacturer to market directly to the retailer; however, for the manufacturer to effectively contact thousands of retailers it would not only be expensive it would be very time consuming. Many products have a limited effective retail life, because design and fashion dictates may change rapidly in some fields. This makes it imperative to market the product quickly and effectively while it is "hot". How to accomplish this without spending vast sums, which may not be recoverable, is a quandary for a small and medium manufacturer. Mailing the retailer product information is one relatively inexpensive method; however, a typical retailer is bombarded with such mailers and they are largely ignored. The manufacturer could send email at a fraction of the cost to the retailer; however, that is almost certain to routed to the "spam" bin.

Thus, there is a need in the art for a method for providing manufacturers with cost effective method to penetrate retail markets with their products.

SUMMARY OF THE INVENTION

It is an object of this invention to provide a method for consumer referral of products to retailers. A manufacturer database is maintained having manufacturer entries including the manufacturer's identification, retailers stocking any of the manufacturer's products, and the manufacturer's products stocked by the retailer. A consumer database with consumer entry is maintained for registered consumers. Products in the manufacturer database are displayed on the public network. A consumer viewing the displayed products on the public network can select a product to refer to a retailer. If the retailer does not stock the referred product or a set number of consumers in the consumer database other than the referring consumer have not already referred the referred product to the referred retailer, then the referred product and the referred retailer are entered into the consumer entry in the consumer database. If the consumer referral results in a sale to the retailer, then the manufacturer rewards the consumer.

Other objects and many of the attendant features of this invention will be more readily appreciated as the same becomes better understood by reference to the following detailed descriptions and considered in connection with the accompanying drawings in which like reference symbols and numbers designate like parts throughout the figures.

BRIEF DESCRIPTION OF THE DRAWINGS

FIG. 4 shows the consumer database in accordance with the present invention.

FIGS. 5A and 5B show the retailer database in accordance with the present invention.

FIG. 6 shows the method of maintaining the databases in accordance with the present invention.

FIGS. 9A and 9B show the method of a consumer using the services to refer a product in the manufacturer database to a retailer in accordance with the present invention.

FIG. 10 shows the method of a manufacturer rewarding a consumer that referred a product to a retailer in accordance with the present invention.

FIGS. 11A, 11B and 11C show the method of a consumer logging in and/or registering in accordance with the present invention.

FIG. 12 shows consumer options in accordance with the present invention.

FIGS. 11A, 11B and 11C show the method of a consumer logging in and/or registering in accordance with the present invention.

FIG. 14 shows the method of a consumer referring a product to a retailer in accordance with the present invention.

FIGS. 15A, 15B and 15C show the method of a manufacturer logging in and/or registering in accordance with the present invention.

FIG. 16 shows manufacturer options in accordance with the present invention.

FIG. 17 shows the method of a manufacturer providing manufacturer product information in accordance with the present invention.

FIG. 20 shows the method of recommending retailer to a manufacturer using the retailer database in accordance with the present invention.

DETAILED DESCRIPTION

Figure 1:
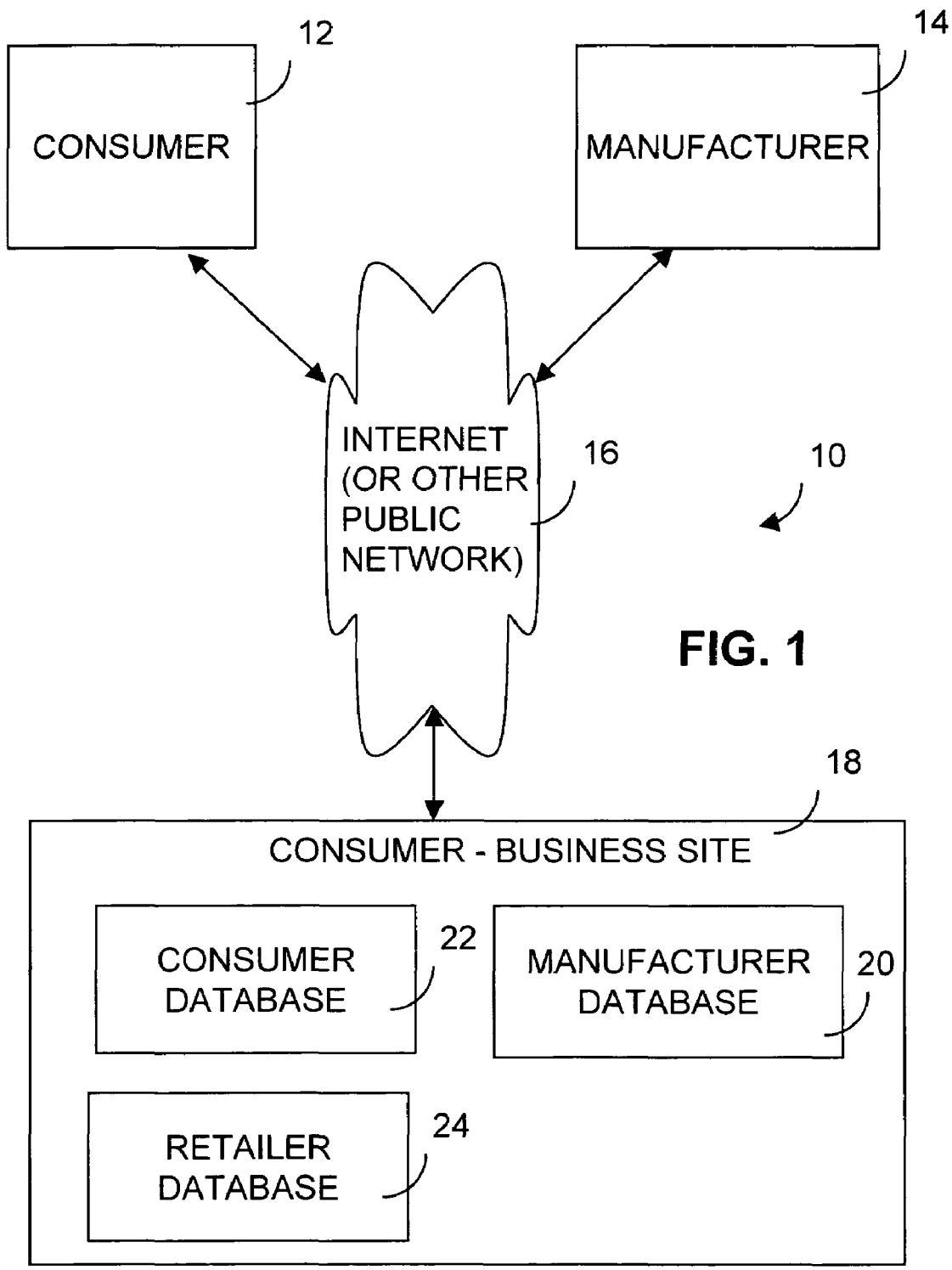
FIG. 1 shows the general architecture within which the method operates in accordance with the present invention.

Referring now to the drawings and in particular to FIG. 1, there is shown a system 10 to provide consumers the capability of referring products from manufacturers to retailers. Consumers 12 with computers coupled to the Internet 16 access a consumer-business web site 18 via the Internet 16 or any other public network. Manufacturers 14 also access the consumer-business site via computers coupled to the Internet 16. The consumer-business web site 18, which essentially consists of a web computer server connected to the Internet, maintains a consumer database 22 and manufacturer database 20 and a retailer database 24.

The consumer-business web site 18 appears to the consumers 12 and the manufacturers 14 as a multitude of web pages with links between pages. The manufacturer interface can be kept separate from the consumer interface to the consumer-business web site 18, by providing a separate manufacturing web site or, as described above the manufacturing web site can be part of an integrated consumer-business web site 18. In either case the information obtained from the consumers 12 and the manufacturers 14 is integrated by web computer server to provide the services described herein to the consumers and manufacturers.

Throughout this description manufacturers includes any wholesale seller of products, whether the wholesale seller in fact manufactures the product. In today's businesses it is rare that a company in fact manufactures a complete product. Often the product is partially produced by another manufacturer, but is brought together and offered for wholesale by the entity identified herein as the manufacturer. Essentially a manufacturer herein is anyone who would sell a product.

The term consumers also encompasses all customers of products whether they be commercial, industrial, retail, or resellers of products. Essentially a consumer is anyone who would buy a product.

Figure 2:
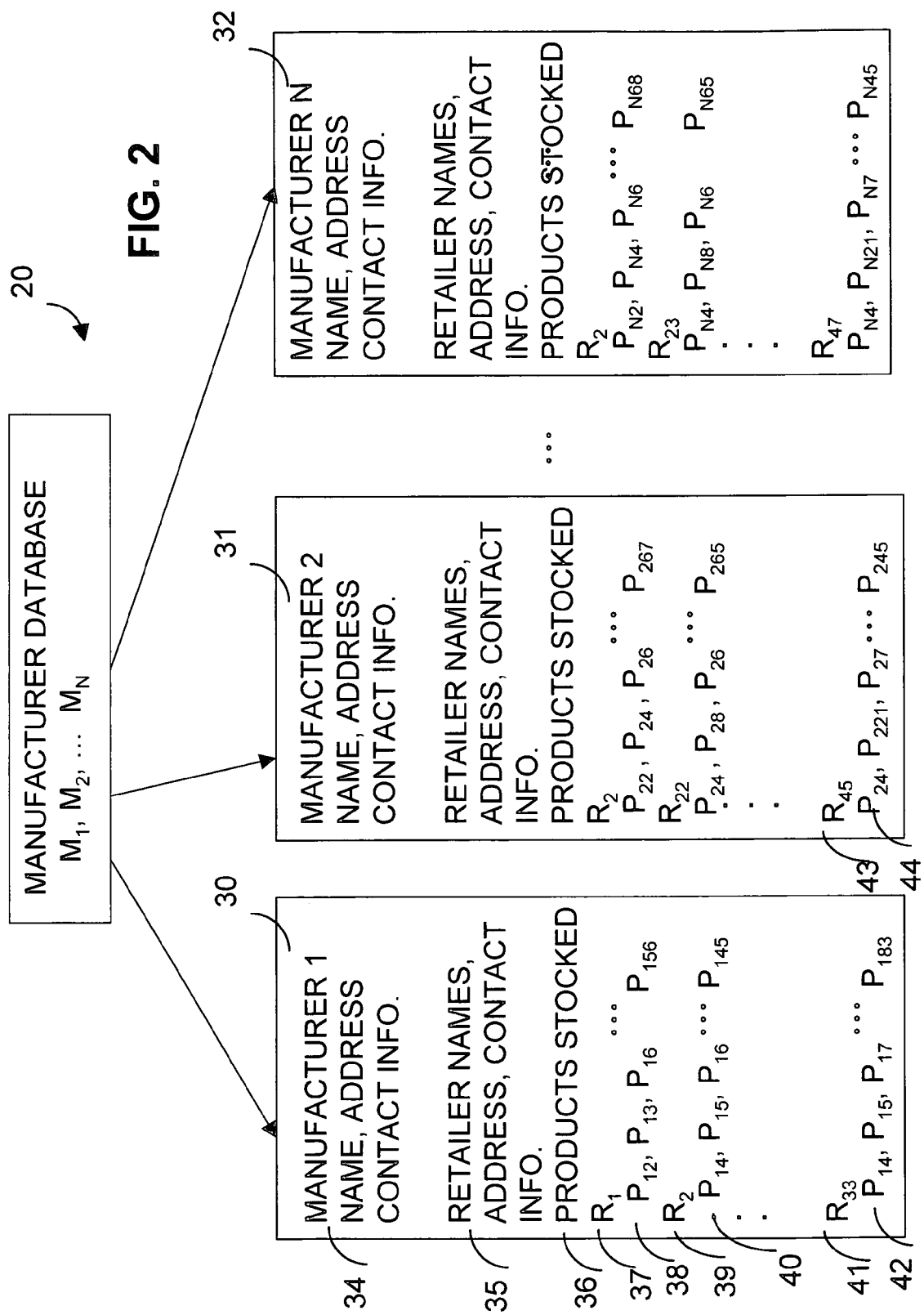
FIG. 2 shows the manufacturer database in accordance with the present invention.
Figure 3:
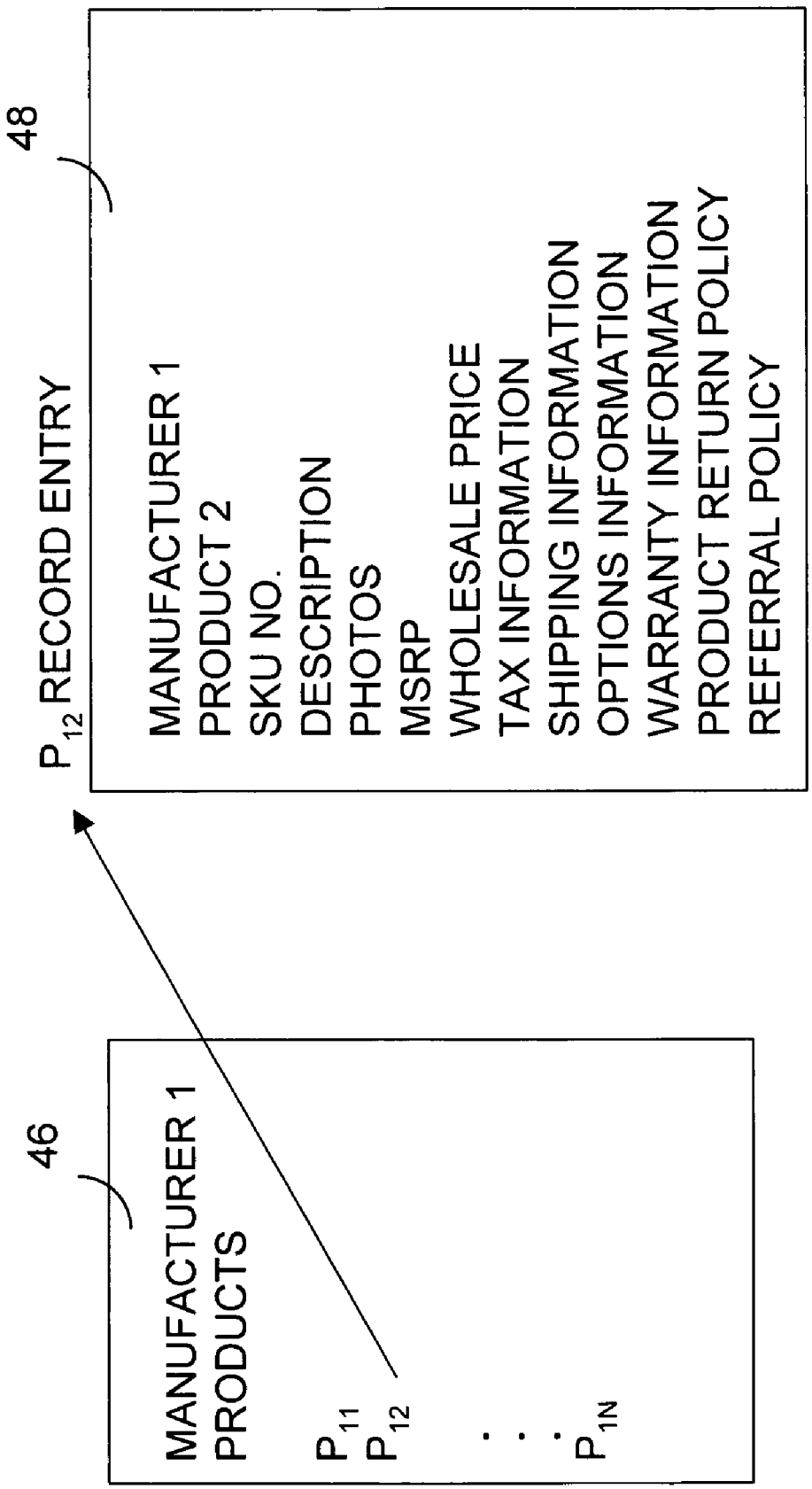
FIG. 3 shows a product entry in the manufacturer database in accordance with the present invention.

Maintaining the databases is essential to being able to provide the services to the consumers and manufacturers. The manufacturer database 20, shown in FIG. 2, contains records for each manufacturer in the database. A record for a manufacturer consists of an entry or entries in the database for the manufacturer. The terms entry, entries, record, and records all refer to data kept in a database. Each manufacturer's entry in the manufacturer database, such as manufacturer entries 30, 31, and 32, contain various data about the manufacturer, the products made by the manufacturer, and the retailers that stock the manufacturer's product. For example, in the record for manufacturer 1, identified by reference no. 30, the manufacturer's record includes the name, address, and contact information 34 for the manufacturer. The manufacturer database 20 also contains a list of the manufacturer's products 46, as shown in FIG. 3. Each product in the manufacturer's record has a product record entry 48, which includes among other information the name of the manufacturer, the product name, the SKU (stock keeping unit) no., the product description, any photos of the product, the manufacturer's suggested retail price, the manufacturer's wholesale price, any tax information, any shipping information, any option information, warranty information for the product, and any product return policy. Most importantly, the product record entry includes a referral policy set by the manufacturer for the product.

The manufacturer's record also includes information for the retailers that stock the manufacturer's products. For each retailer, the information includes the retailer's name, address, and contact information 35. The information also includes the products stocked by the retailer. For example, retailer 37 ($R_1$) stocks products 38 ($P_{12}$, $P_{13}$, $P_{16}$ ... $P_{156}$), retailer 39 ($R_2$) stocks products 40 ($P_{14}$, $P_{15}$, $P_{16}$ ... $P_{145}$) and retailer 41 ($R_{33}$) stocks products 42 ($P_{14}$, $P_{15}$, $P_{17}$ $P_{183}$). The products for each manufacturer have unique identifiers due to their uniqueness to the particular manufacturer. Sometimes manufacturers may use the same retailer as shown in FIG. 2 in which both manufacturer 1 and manufacturer 2 have the same retailer $R_2$; however, the products stocked by retailer $R_2$ are unique for manufacturer 1 and manufacturer 2. The retailers used by the manufacturers can also be different and that may be normally the case depending on the product. For example, in FIG. 2, manufacturer 2 uses retailer 43 ($R_{45}$) that sells products 44 ($P_{24}$, $P_{221}$, $P_{27}$ $P_{245}$). Retailer 43 ($R_{45}$) is not used by manufacturer 1.

FIGS. 4A and 4B illustrate the consumer database 22. Each consumer in the database is identified as shown in FIG. 4B, including a consumer's name, address and contact information 50. The consumer database also includes records for each consumer of the products referred by the consumer to a retailer. For example, in the record with reference no. 52, consumer 1 referred product i to retailers 60, including retailers 2, 4, 61, and 64. Consumer 1 also referred product j in the record with reference no. 52, to retailers 62, including retailers 4, 5, 63, and 71. Other consumers 56 and 58 referred other products to retailers. The products referred by the consumers can be related to a manufacturer by searching the manufacturer database.

Figure 5A:
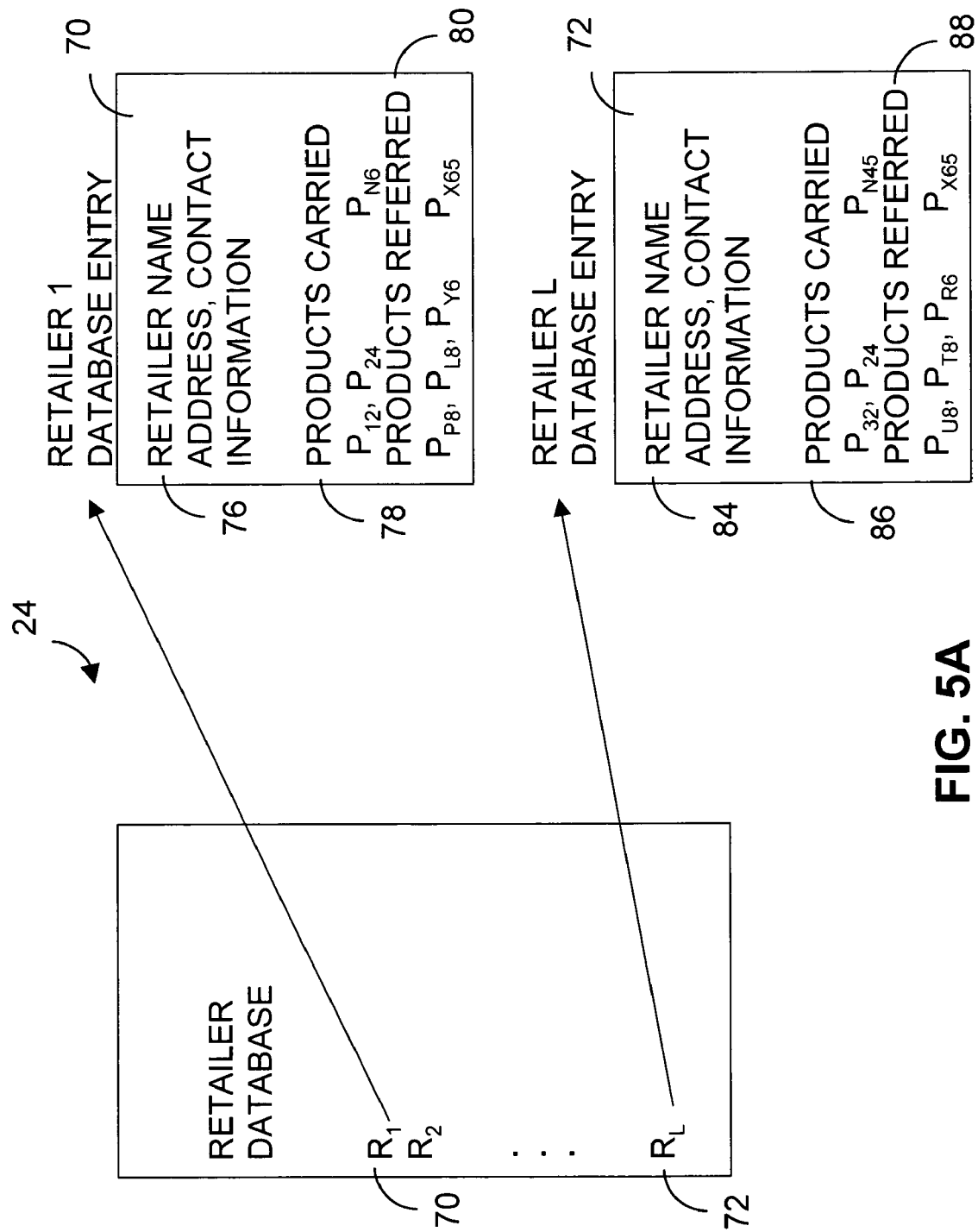

The retailer database 24 is constructed by combining the information in the manufacturer database with the information in the consumer database, as shown in FIG. 5A. The retailer database 24 contains records, such as records 70 and 72, for each retailer identified in either of the manufacturer or consumer databases. Each record for a retailer includes the retailer's name, address, and contact information 76, 84, the products carried by the retailer 78, 86, and the products referred to the retailer 80, 88, respectively, as shown in retailer records 70 and 72. FIG. 5B shows a retailer database 24 including retailers A, B, and N. As shown, the contact information can include phone numbers, e-mail addresses, and Web addresses. The contact information can also include contact names for the retailer. The retailer database allows both consumers and manufacturers to readily search retailers to determine the products they stock, how to contact the retailers, and to determine their locations.

The method of operation of the consumer-business service is described in the following.

In the steps of FIG. 6 the consumer-business service provider maintains the manufacturer, consumer and retailer databases described above. In step 100, the consumer-business service provider maintains the manufacturer database 20, which as described above includes a plurality of records. Each record for a manufacturer includes the manufacturer's name, address, contact information, and for each retailer stocking any of the manufacturer's products, the retailer's name, address, and contact information, and the products of the manufacturer stocked by the retailer. In step 102, the consumer-business service provider maintains for each manufacturer record in the manufacturer database, product information for each of manufacturer's products. The product information includes the product name, SKU number, description, photos, MSRP (manufacturer's suggested retail price), wholesale price, tax information, shipping information, options information, warranty information, product return policy, and referral policy. In step 104 the consumer-business service provider maintains a consumer database including a plurality of records, each record for a consumer including the consumer name, address, contact information, and for each product referred by the consumer, the retailers to which the product was referred by the consumer. In step 106 the consumer-business service provider maintains a retailer database including a plurality of records, each record for a retailer containing data including the retailer's name, address, and contact information, products stocked by the retailer, and products referred to the retailer.

Figure 7:
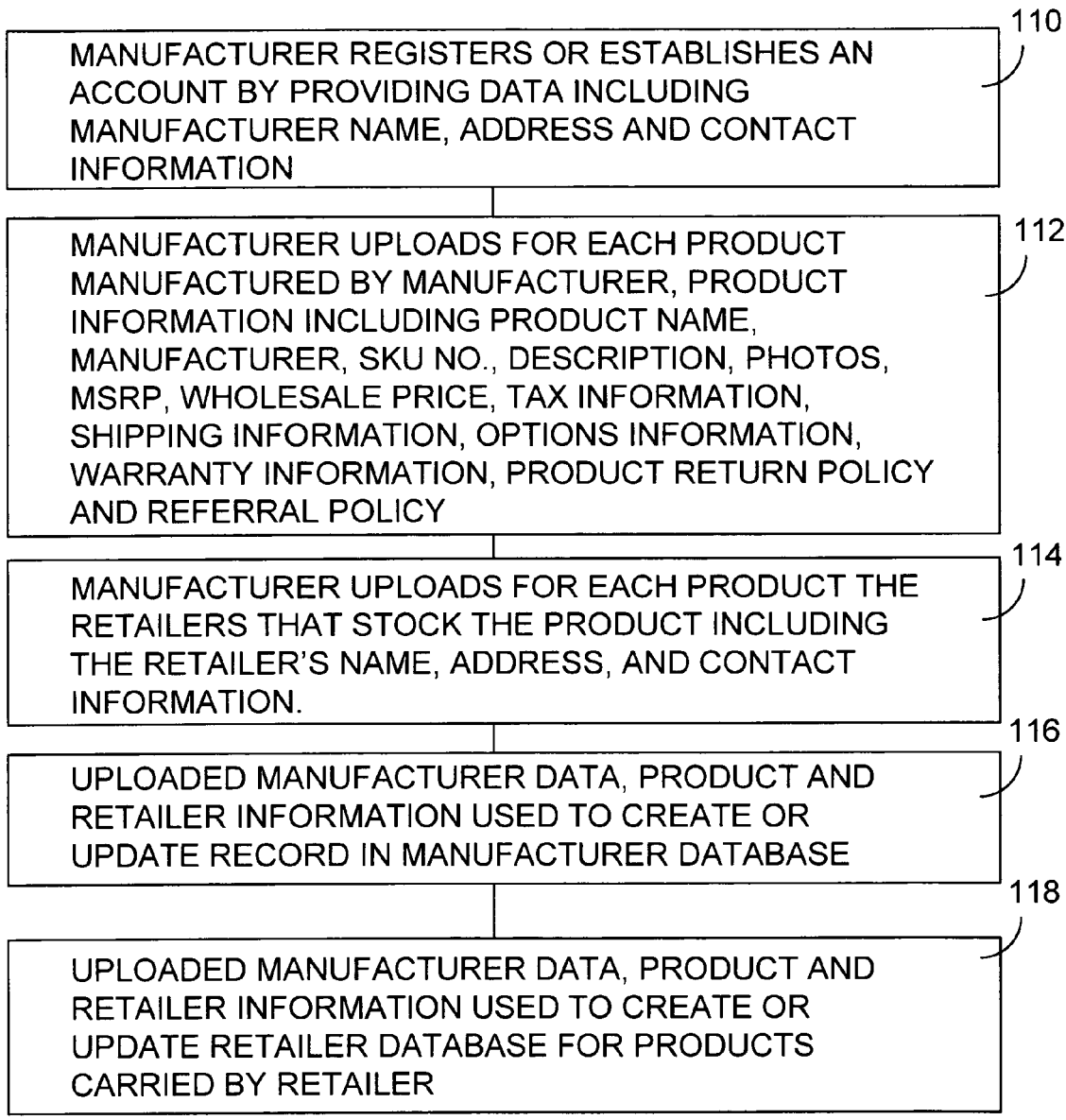
FIG. 7 shows the method of the creating and maintaining the manufacturer database in accordance with the present invention.

For a manufacturer to participate in the service, as shown in FIG. 7, in step 110 a manufacturer accesses the service provider web site and registers or establishes an account by providing data including the manufacturer's name, address and contact information. Then in step 112, the manufacturer uploads for each product manufactured by manufacturer, product information including the product name, the manufacturer, SKU no., description, photos, MSRP, wholesale price, tax information, shipping information, options information, warranty information, product return policy and referral policy. Then in step 114 the manufacturer uploads for each product the retailers that stock the product including the retailer's name, address, and contact information. In step 116 the uploaded manufacturer data, product and retailer information are used to create or update a record or entry for the manufacturer in the manufacturer database. In step 118 the uploaded manufacturer data, product and retailer information is also used to create or update a records or entries in the retailer database for products carried or stocked by retailers.

Figure 15A:
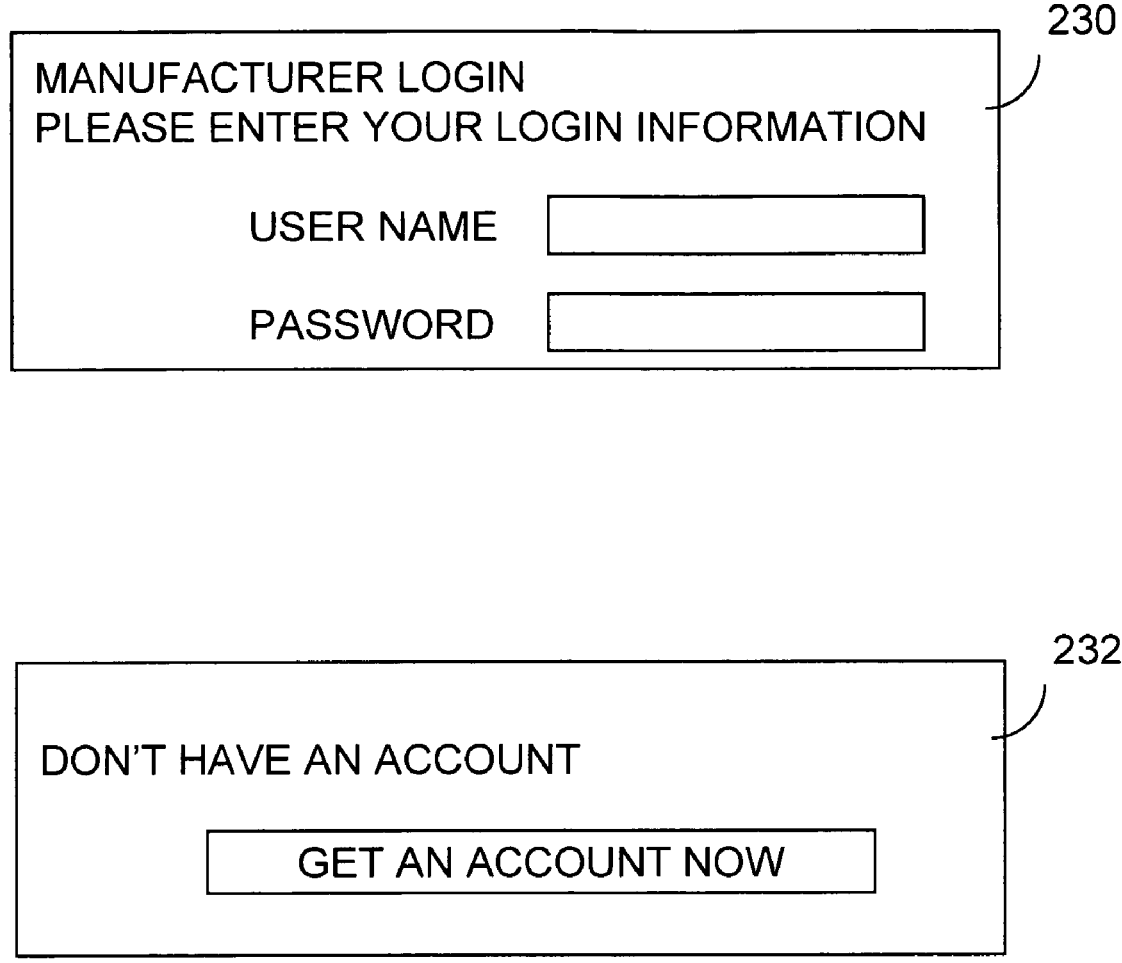

FIG. 15A shows a service provider manufacturer login screen 230, which asks for the manufacturer user name and password. If the manufacturer does not have an account, then screen 232 has a link for the manufacturer to establish or register an account. FIG. 15B shows a screen 234 for the manufacturer to register and provide manufacturer information, including the manufacturer's name, address, phone number, email address, and web address. Other selections can be provided, such as whether the manufacturer would like to subscribe to the service provider's mailing list. The manufacturer is prompted to ready the service provider's terms for providing service to the manufacturer. If the manufacturer agrees to the terms, then in FIG. 15C a screen 236 is shown for the manufacturer to establish a user name and password.

Once a manufacturer is registered and/or logged in, then screen 238 shown in FIG. 16 can be displayed to the manufacturer over the Internet. As shown, the manufacturer has links to browse the online products store, to edit the manufacturer's profile or information, to add or edit products of the manufacturer on the service provider site, to change their password, or to log out of the site.

If the manufacturer selects to add a product onto the service provider site, the manufacturer is displayed screen 240 shown in FIG. 17. The manufacturer enters the product name, and the manufacturer name, which may be the same as the entry in the manufacturer database in which case, the manufacturer name can be automatically entered by the service provider. However, in some cases the manufacturer name may in fact be different than a wholesaler's name and it may be desirable to list the actual manufacturer here. Whether a referring consumer is rewarded by the wholesaler or the manufacturer, should be transparent to a consumer, so herein manufacturers and wholesalers are interchangeable. The manufacturer enters the product option, warranty and return policies, as shown in FIG. 17. A referral/reward policy for the product, which indicates how referring consumers are rewarded, is also entered by the manufacturer. Other items entered for the product include product images, discounted price, the MSRP, the wholesale price, the weight and dimensions, the product SKU, and whether shipping and tax is added to the price. The manufacturer can also list manufacturing representatives used by the manufacturer for the product.

Figure 8A:
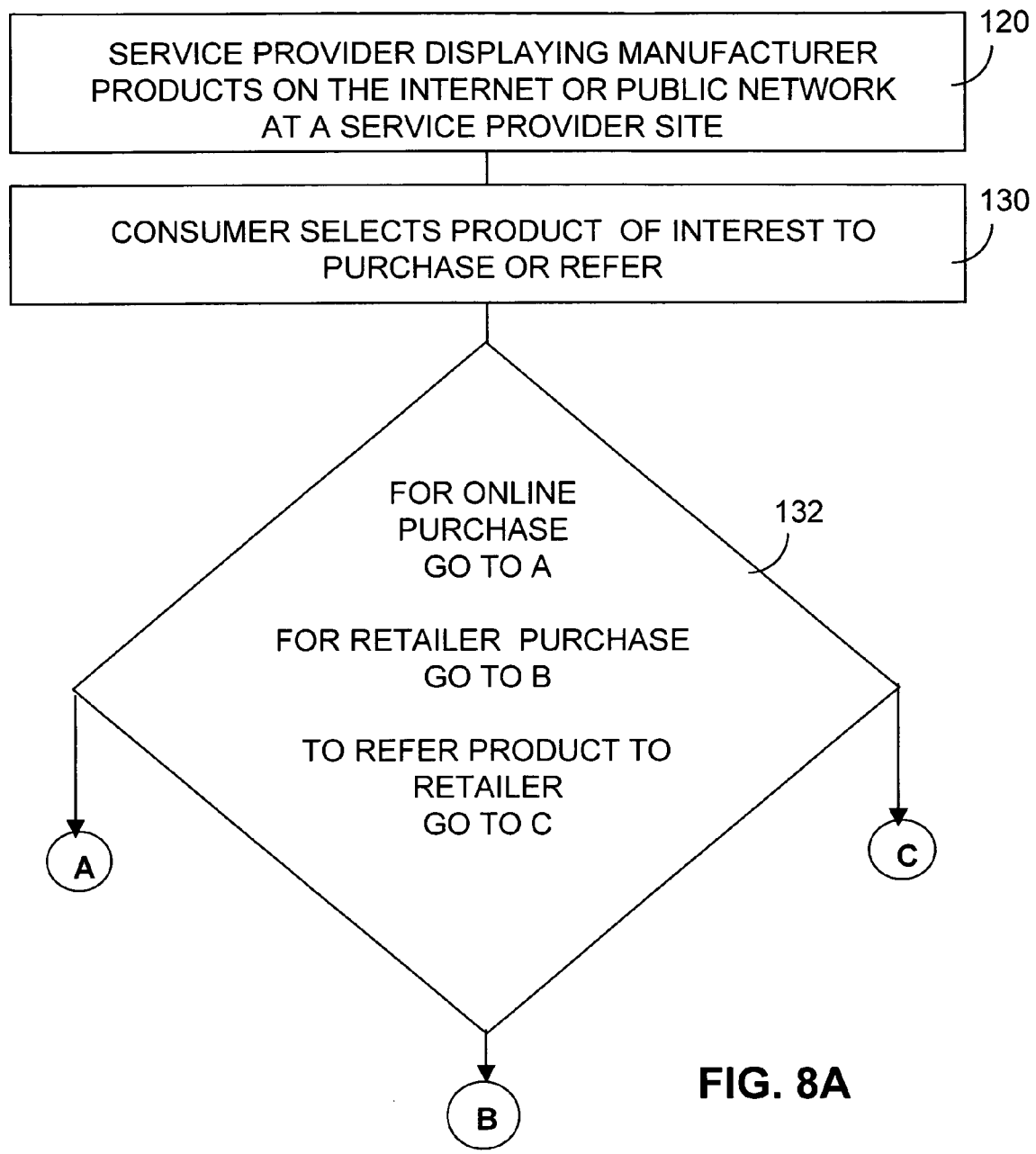
FIG. 8A shows the method of a consumer using the services in accordance with the present invention.

A consumer participates in the service by accessing the service provider web site. As shown in FIG. 8A, in step 120 the service provider displays manufacturer products in the manufacturer database on the Internet or public network at a service provider site. The consumer can view the displayed products. Then in step 130 the consumer selects a product to purchase or to refer to a retailer. In step 132 it is determined whether a consumer wants to purchase the product online, purchase the product at a retailer, or refer the product to a retailer for the retailer to stock the product.

Figure 8B:
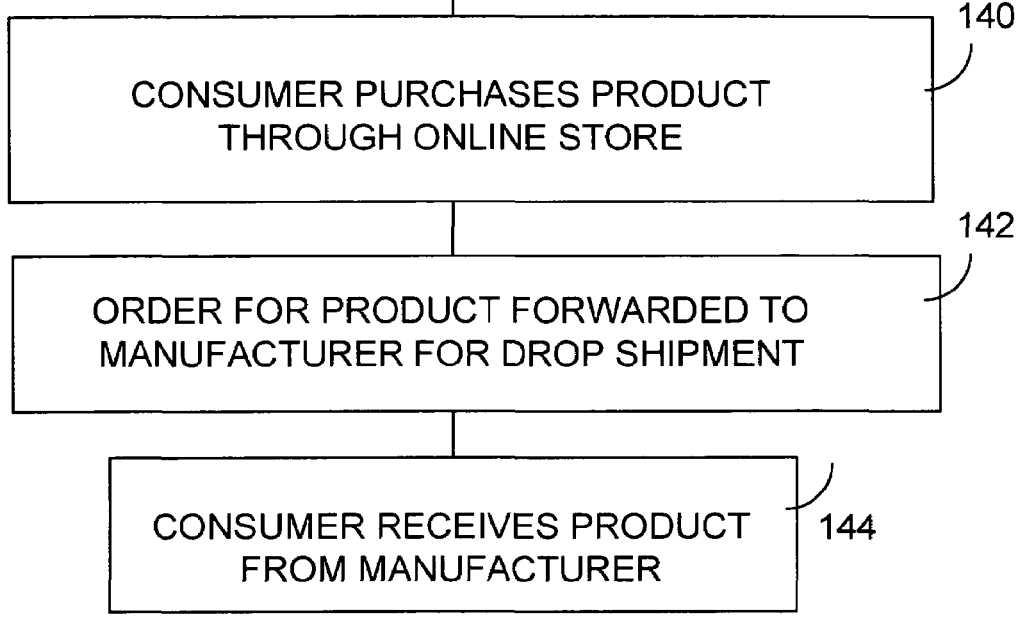
FIGS. 8B and 8C show the method of a consumer using the services to purchase a product in the manufacturer database in accordance with the present invention.

If the consumer purchases the selected product online in step 140 of FIG. 8B, then after the consumer registers and provides payment information, the order for the product is forwarded to the manufacturer of the product for drop shipment to the consumer in step 142. Then in step 144 the consumer receives the product from the manufacturer.

Figure 8C:
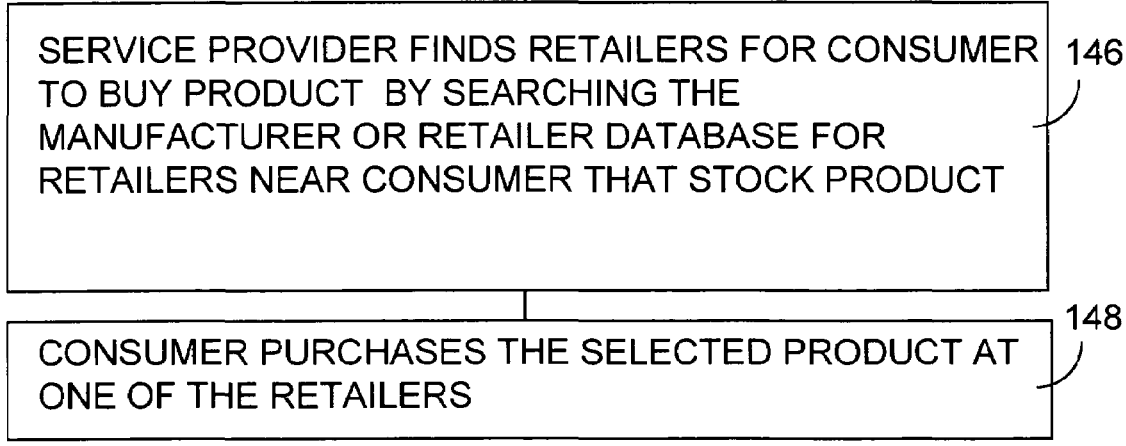

If the consumer desires to purchase the product at a retailer, then in step 146 of FIG. 8C, the service provider finds the retailers at which the consumer can buy the product by searching the manufacturer database or the retailer database for retailers near the consumer that stock the product. The consumer then purchases the selected product at one of the retailers in step 148.

If the consumer desires to refer a selected product, then in step 150, as shown in FIG. 9A, the consumer logs onto the service provider web site, if account already established, or consumer establishes or registers an account by providing consumer data including the consumer's name, address and contact information. In step 152 the entered consumer data is used to create or update an entry or record for the consumer in the consumer database. In step 154, the consumer refers the selected product to a retailer by providing the retailer's name, address, and contact information. Then in step 156 the retailer database is checked to determine whether the retailer already stocks the selected product or whether another consumer has already referred the product to the retailer. This is a filter that filters out unnecessary referrals. If the retailer does not stock the product or another consumer has not referred the product to the retailer, then in step 158 the entered retailer name, address and contact information and the referred product is used to create or update the retailer record in the retailer database. The retailer record update indicates that the product has been referred to the retailer. The referral from the consumer is also used to update in step 158 the consumer entry or record in the consumer database to indicate that the consumer has referred the product to the retailer.

One referral of a product to a retailer is probably not sufficient to motivate the retailer to stock a product. Thus, the filter on referrals can be set higher so that a consumer that refers a product to a retailer can get credit for the referral enough though a number of consumers have previously referred the product to the consumer. If this policy is allowed by the manufacturers referral policy for the product as stored in the manufacturer database 20, then step 158 is replaced by step 160 in FIG. 9B. In step 160, if the retailer does not stock the referred product and the manufacturer referral policy permits a reward to the first set number of consumers that refer a product to a retailer, then if less than the set number of consumers have referred the product to the retailer, the entered retailer name, address and contact information and the referred product are used to create or update the retailer record in the retailer database to indicate that the product has been referred to the retailer. The same data is also used to update the consumer record in the consumer database to indicate that the consumer has referred the referred product to the retailer.

Once the referral of the product by the consumer to the retailer has been entered in the databases, then in step 170 of FIG. 10 the referred retailer's name, address, and contact information are provided to the manufacturer. Then in step 172, the manufacturer or manufacturer representative attempts to sell the referred product to the referred retailer. In step 174 if a sale is made to the retailer, then the retailer record in the retailer database is updated to indicate the retailer stocks the product, and the manufacturer record in the manufacturer database is updated to indicate that the retailer stocks the product. Also in step 174 the consumer records and entries in the consumer database are searched to determine the consumer or consumers that referred the product to the retailer. In step 176 if the policy of the manufacturer is to reward the first consumer that referred the product, then the referring consumer is rewarded by the manufacturer, and the consumer record in the consumer database is updated to remove the referral of the product. Alternately in step 178, if the policy of the manufacturer is to reward a first set number of consumers that referred the product, then the referring consumers are rewarded by the manufacturer, and the each of the referring consumer records or entries in the consumer database are updated to remove the referrals of the product.

FIG. 11A shows a service provider consumer login screen 180, which asks for the user name and password. If the consumer does not have an account, then screen 182 has a link for the consumer to establish or register an account. FIG. 11B shows a screen 184 for the consumer to register and provide consumer information, including the consumer's name, address, phone number, and email address. Other selections can be provided, such as whether the shipping address is the same as the consumer's address (if not then the consumer would be prompted to supply the shipping address), and whether the consumer would like to subscribe to the service provider's mailing list. Once the consumer has registered then in FIG. 11C a screen 186 is shown for the consumer to establish a user name and password.

Once a consumer is registered and/or logged in, then screen 188 shown in FIG. 12 can be displayed to the consumer over the Internet. As shown, the consumer has links to browse the online products store, to view the consumer's purchase history, to view the consumer's product referrals, to edit the consumer's profile or information, such as their address, to change their password, or to log out of the site.

Figure 13A:
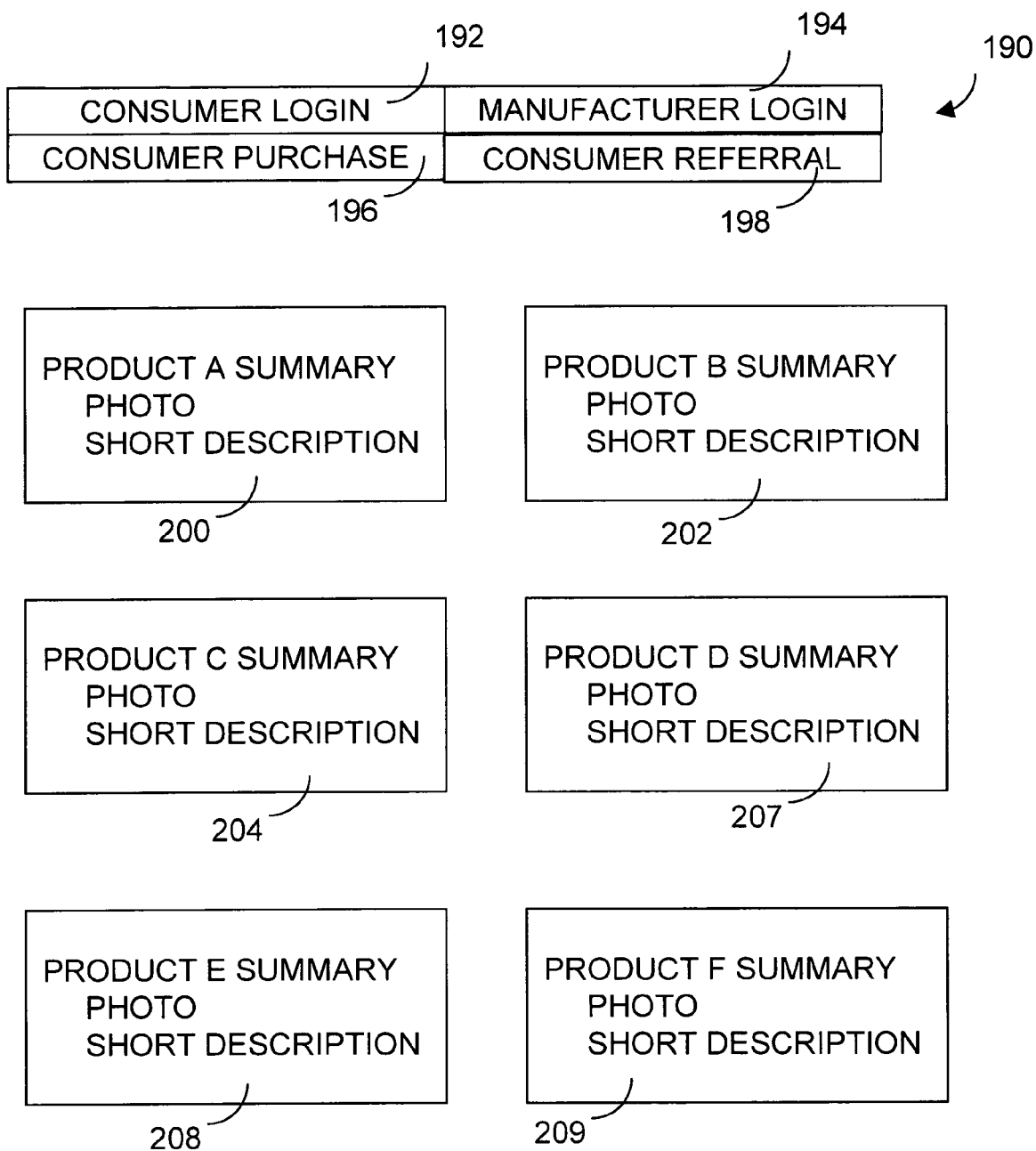
FIGS. 13A and 13B show the product display to a consumer of the products in the manufacturer database in accordance with the present invention.
Figure 13B:
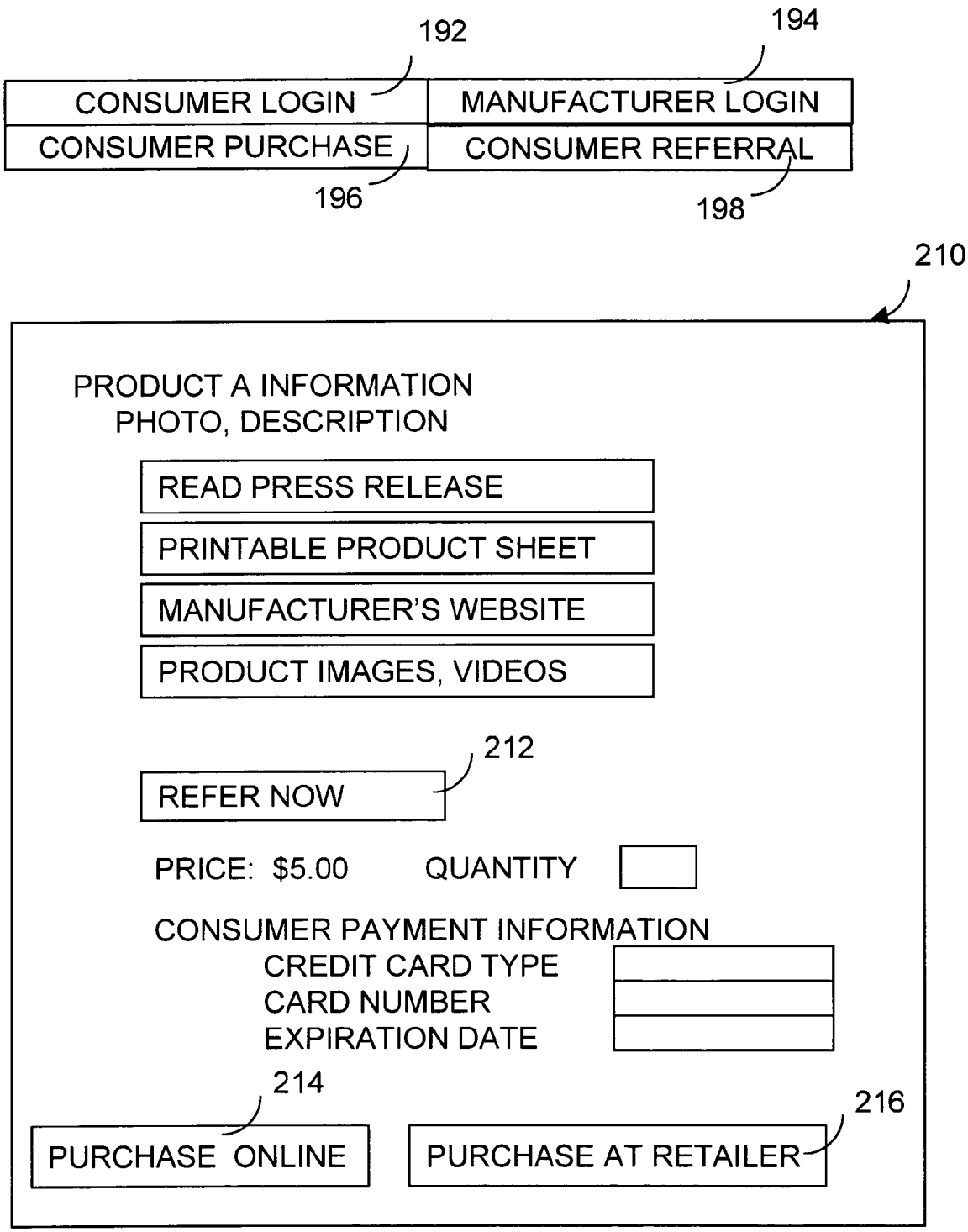

FIG. 13A is an illustration of the online product store screen 190. This page can be accessed directly by anyone, including unregistered consumers and unregistered manufacturers. At the top of the screen are links for consumer login 192, manufacturer login 194, consumer purchase 196, and consumer referral 198. Below are product displays, which can include a product summary, photos, and a short description of the product. For example, product A 200, product B 202, product C 204, product D 207, product E 208, and product F 209 are shown. The consumer can select an item to inspect further by clicking on a link associated with the product. For example, if the consumer selects to further inspect product A, then the consumer can be directed to a web page showing more information 210 about product A, as shown in FIG. 13B. The expanded product A information can include product press releases, printable product sheets, links to the manufacturer's website, and additional product images and videos.

The product information screen displayed to the consumer also has links to allow the consumer to refer the product 212, to purchase the product online 214, and to find a retailer at which to purchase the product 216. If the consumer chooses to purchase the product online, then the consumer enters payment information and the purchase is completed as indicated in FIG. 8B. If the consumer chooses to find a retailer at which to purchase the product, then the purchase is completed as indicated in FIG. 8C.

If the consumer chooses to refer the product, then the consumer is displayed referral screen 220, shown in FIG. 14. On this screen the consumer enter consumer contact information, such as address, phone number, and email address. Alternately, if the consumer is registered and logged in, the service provider can fill in this information automatically from the information already in the consumer entry in the consumer database. Then the consumer can ask that catalogs or printed material be sent to the consumer to assist in making referrals. The product to be referred is confirmed by the consumer. Then the consumer provides information on the retailer to which the product is being referred including the retailer's name, address, and contact information, such as phone number, fax number, web address, and email address, if known. The consumer can also provide comments or suggestions relative to the retailer, which can help the manufacturer make an effective presentation to the retailer. The referral to the retailer then proceeds as indicated in FIGS. 9A, 9B, and 10.

Figure 18:
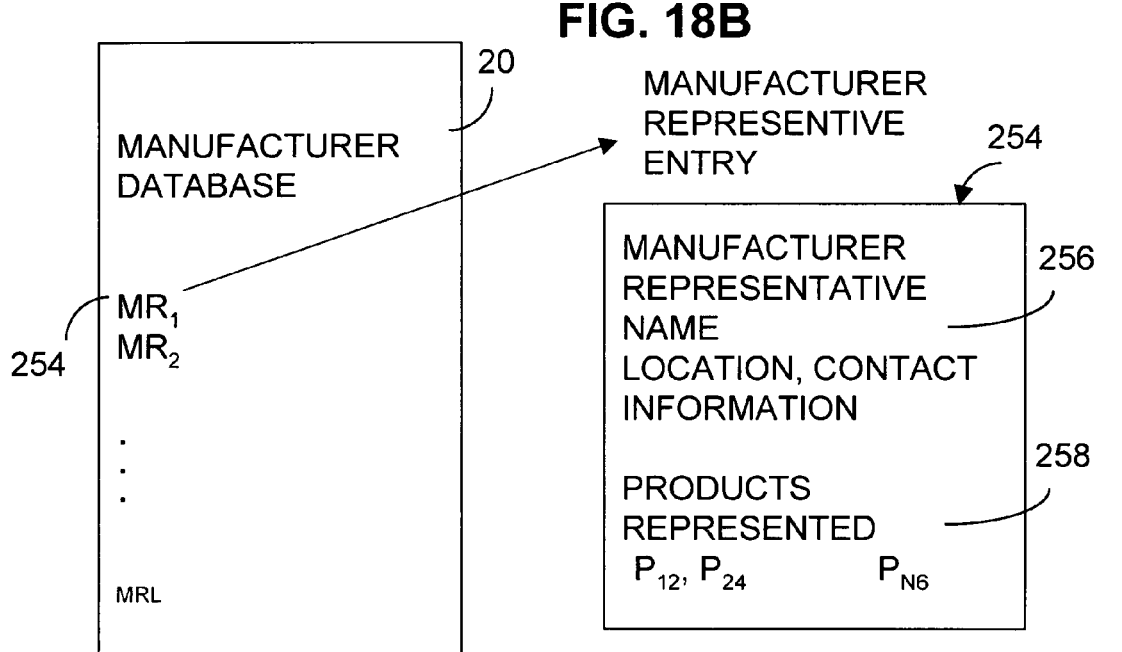
FIGS. 18A and 18B show the method of providing retailer search and manufacturer representative search services in accordance with the present invention.

Once the manufacturer, consumer, and retailer databases are established the service provider may provide additional services. In one service the service provider, as shown in FIG. 18A, may search the retailer database in step 250 to find retailers and retail contact information for possible sale of manufacturer's products. Alternately, the service provider can allow the manufacturer to search the retailer database directly.

The manufacturer can enter as shown in FIG. 17, the manufacturing representatives, who represent the manufacturer to retailers that the manufacturer uses for the product. As shown in FIG. 18B, the entry for the manufacturer in the manufacturer database 20 can include a list 254 of all the manufacturer representatives used by the manufacturer. Each manufacturer representative entry can include the manufacturer's name, location, and contact information 256. The entry includes a list of the products represented 258, such as $P_{12}, P_{24} \ldots P_{N6}$ by the manufacturer representative for the manufacturer. Finding manufacturer representative in dispirit regions of the country can be a difficult task for a small or medium manufacturer. The service provider can provide the service to a manufacturer of searching the manufacturer database to find manufacturer representatives that may be used by other manufacturers for similar products and recommending the manufacturer representatives to the manufacturer, as shown in step 252 of FIG. 18B. In addition, the service provider can allow the manufacturer to directly search the manufacturing database to find manufacturing representatives used by other manufacturers.

Figure 19:
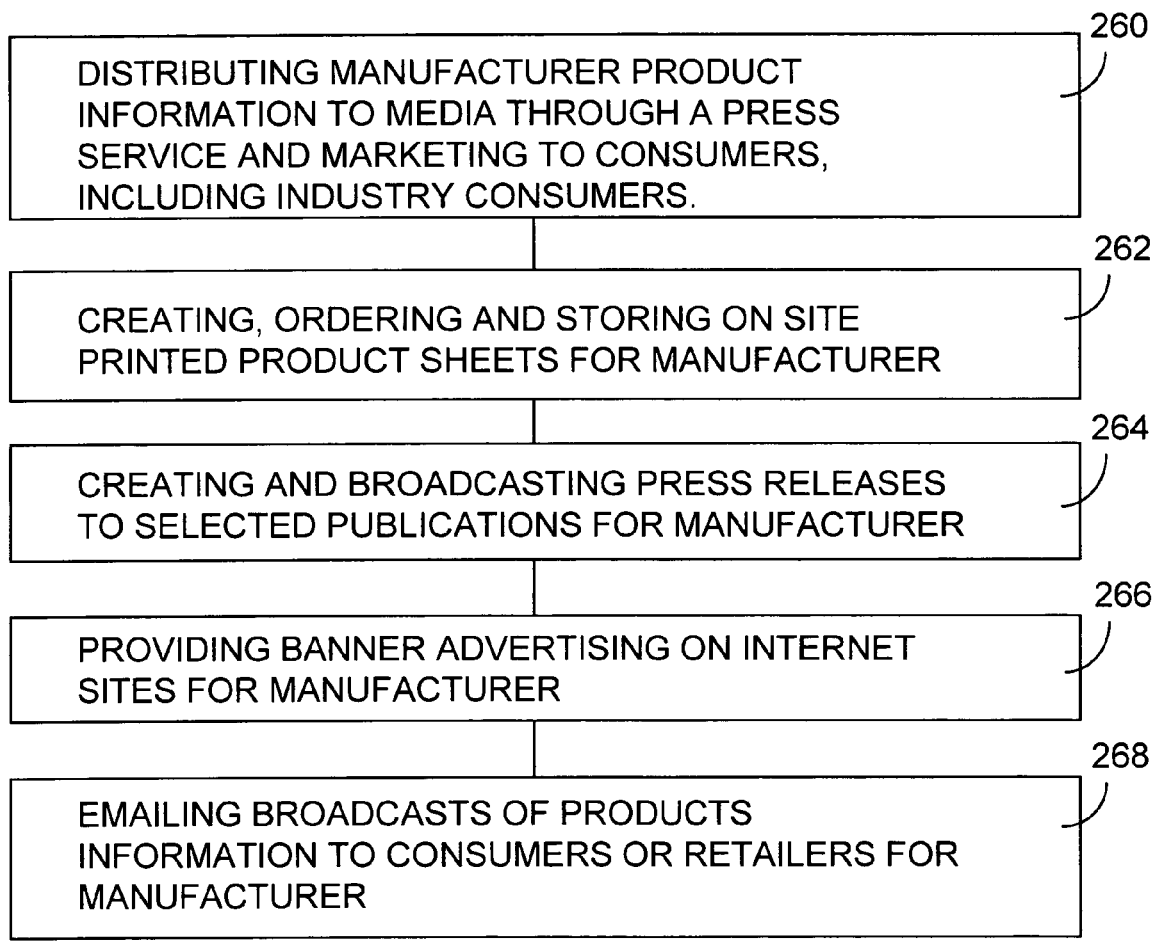
FIG. 19 shows the method of providing additional services to a manufacturer in accordance with the present invention.

Other services can be provided to manufacturers, as shown in FIG. 19. The manufacturer's product information can distributed to media through a press service and marketed to consumers, including industry consumers, as shown in step 260. Printed product sheets can be created, ordered and stored on site for the manufacturer, as shown in step 262. Press releases can be created and broadcast to selected publications for the manufacturer, as shown in step 264. Banner advertising on internet sites can be provided for the manufacturer, as shown in step 266. Email broadcasts of product information can be made to consumers or retailers for the manufacturer, as shown in step 268.

Another service that can be provided is to optimize the marketing of a manufacturer's products to retailers as indicated in the steps of FIG. 20. In step 270 for a manufacturer record or entry in the manufacturer database the products sold by the manufacturer to a selected retailer are compared to all the products stocked by another retailer in the retailer database. This step can also be performed by performing searches using the manufacturer database, because the retailer database is constructed using the data in the manufacturer database. Then in step 272, the products sold by the manufacturer to the selected retailer are compared to the products stocked the other retailer in the retailer database by comparing the descriptions of the products sold to the selected retailer to the descriptions of all the products stocked by the other retailer in the retailer database. Note step 272 may also be performed by searching the manufacturer database. The product descriptions are accessed in the manufacturer database. In step 274, if the comparison between the description of products sold by the manufacturer to the selected retailer and the description of all the products stocked by the other retailer passes a threshold value, then the manufacturer is recommended to attempt to sell the products sold by the manufacturer to the selected retailer to the other retailer. In step 276 these steps are repeated for each retailer in the retailer database or the manufacturer database.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope of the present invention and additional fields in which the present invention would be of significant utility.

It is therefore intended by the appended claims to cover any and all such applications, modifications and embodiments within the scope of the present invention.

What is claimed is:

1. A method of consumer to business referral managed by a service provider on behalf of consumers and manufacturers participating over a public network and accessing the service provider over the public network, the method comprising the following steps:

maintaining a manufacturer database including a plurality of manufacturer entries, each entry for a manufacturer in the manufacturer database including the manufacturer's identification, and for each retailer stocking any of the manufacturer's products, the retailer's identification and identification of the manufacturer's products stocked by the retailer;

maintaining a consumer database including a plurality of consumer entries, each entry for a consumer in the consumer database including the consumer's identification;

displaying products in the manufacturer database on the public network;

a consumer viewing the displayed products on the public network and selecting a referral product for referral to a referred retailer;

receiving from the referring consumer over the public network the referral product, the referral product including a referred product identification and a referred retailer identification corresponding to the referred retailer;

searching the manufacturer database to determine whether the referred retailer already stocks the referral product;

searching the consumer database to determine whether a set number of consumers in the consumer database other than the referring consumer have already referred the referral product to the referred retailer;

including the referred product identification and the referred retailer identification in the entry for the referring consumer in the consumer database and informing the manufacturer of the referral of the referral product, if the referred retailer does not already stock the referral product and if a set number of consumers in the consumer database have not already selected the referral product for referral to the referred retailer, otherwise not including the referred product identification and the referred retailer identification in the entry for the referring consumer in the consumer database and not informing the manufacturer of the referral of the referral product; and if a sale is made by the manufacturer of the referral product to the referred retailer, then updating the manufacturer entry in the manufacturer database to indicate that the referred retailer stocks the referral product and rewarding the referring consumer with a reward, otherwise not updating the manufacturer entry in the manufacturer database to indicate that the referred retailer stocks the referral product and not rewarding the referring consumer with a reward.

2. The method of claim 1, wherein the set number is one.

3. The method of claim 1, wherein the set number is greater than one.

4. The method of claim 1, wherein maintaining a manufacturer database further comprises the following steps:

manufacturer including in the manufacturer entry in the manufacturer database for each product manufactured by manufacturer referral policy;

wherein the referral policy comprises the set number and the reward for rewarding the referring consumer.

5. A method of consumer to business referral managed by a service provider on behalf of consumers and manufacturers participating over a public network and accessing the service provider over the public network, the method comprising the following steps:

maintaining a manufacturer database including a plurality of manufacturer entries, each entry for a manufacturer in the manufacturer database including the manufacturer's identification, the manufacturer's products, descriptions of the manufacturer's products, manufacturing representative information for each product, and for each retailer stocking any of the manufacturer's products, the retailer's identification and identification of the manufacturer's products stocked by the retailer;

maintaining a consumer database including a plurality of consumer entries, each entry for a consumer in the consumer database including the consumer's identification;

displaying products in the manufacturer database on the public network;

a consumer viewing the displayed products on the public network and selecting a referral product for referral to a referred retailer;

receiving from the referring consumer over the public network the referral product, the referral product including a referred product identification and a referred retailer identification corresponding to the referred retailer;

searching the manufacturer database to determine whether the referred retailer already stocks the referral product;

searching the consumer database to determine whether a set number of consumers in the consumer database other than the referring consumer have already selected the referral product for referral to the referred retailer;

including the referred product identification and the referred retailer identification in the entry for the referring consumer in the consumer database and informing the manufacturer of the referral of the referral product, if the referred retailer does not already stock the referral product and if a set number of consumers in the consumer database have not already selected the referral product for referral to the referred retailer, otherwise not including the referred product identification and the referred retailer identification in the entry for the referring consumer in the consumer database and not informing the manufacturer of the referral of the referral product;

if a sale is made by the manufacturer of the referral product to the referred retailer, then updating the manufacturer entry in the manufacturer database to indicate that the referred retailer stocks the referral product and rewarding the referring consumer with a reward, otherwise not updating the manufacturer entry in the manufacturer database to indicate that the referred retailer stocks the referral product and not rewarding the referring consumer with a reward;

maintaining a retailer database including a plurality of retailer entries, each retailer entry containing data including the retailer name, address, contact information, products stocked by the retailer, and referral products referred to the retailer;

merging into a retailer entry in the retailer database for any retailer having the same retailer's identification in any entry in the manufacturer database, the products stocked by the retailer for any manufacturer in the manufacturer database; and merging into the retailer entry in the retailer database for any retailer having the same retailer's identification in any entry in the consumer database, the referral products referred to the retailer by any consumer in the consumer database.

6. The method of claim 5, further comprising the steps of:
a manufacturer searching the retailer database to locate retailers not stocking the manufacturer's product.

7. The method of claim 5, further comprising the steps of:
the service provider searching the retailer database to locate retailers not stocking a manufacturer's product in the manufacturer database; and
the service provider emailing broadcasts of manufacturer's product information to retailers not stocking the manufacturer's product.

8. The method of claim 5, further comprising the steps of:
the service provider searching the manufacturer database to find a manufacturer representative that represents products similar to a particular manufacturer's product in the manufacturer database by comparing the description of the particular product to the descriptions of other products in the manufacturing database by accessing the product descriptions in the manufacturer database; and
the service provider recommending the manufacturer representative to the manufacturer for representing the particular manufacturer's product.

9. The method of claim 5, further comprising the steps of:
comparing the products in a manufacturer entry in the manufacturer database sold by the manufacturer to a selected retailer to all products stocked by another retailer in the retailer database by comparing the descriptions of the products sold to the selected retailer to the descriptions of the products stocked by the other retailer in the retailer database by accessing the product descriptions in the manufacturer database; and
recommending to the manufacturer to attempt to sell the products sold by the manufacturer to the selected retailer to the other retailer, if the comparison between the description of products sold by the manufacturer to the selected retailer and the description of all the products stocked by the other retailer passes a threshold value.

10. The method of claim 9, further comprising the steps of:
repeating the steps of claim 9 for each retailer in the retailer database.

11. The method of claim 10, further comprising the steps of:
repeating the steps of claims 9 and 10 for each retailer in the manufacturer entry in the manufacturer database.

* * * * *